United States Patent
Cuffaro

(10) Patent No.: US 7,123,924 B2
(45) Date of Patent: Oct. 17, 2006

(54) METHOD AND SYSTEM FOR DETERMINING THE SPEED AND POSITION OF A MOBILE UNIT

(75) Inventor: Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 418 days.

(21) Appl. No.: 10/330,637

(22) Filed: Dec. 27, 2002

(65) Prior Publication Data

US 2004/0203905 A1    Oct. 14, 2004

Related U.S. Application Data

(60) Provisional application No. 60/392,413, filed on Jun. 28, 2002.

(51) Int. Cl.
*H04Q 7/20* (2006.01)
*H04M 1/00* (2006.01)

(52) U.S. Cl. .............. 455/456.1; 455/422.1; 455/456.5; 455/456.6; 455/550.1; 455/562.1

(58) Field of Classification Search .............. 455/427, 455/429–430, 435.1, 435.2, 436, 439–441, 455/67.11, 550.1, 561, 562.1; 342/107, 113
See application file for complete search history.

(56) References Cited

U.S. PATENT DOCUMENTS

| | | | |
|---|---|---|---|
| 4,409,687 A | 10/1983 | Berti et al. | |
| 5,670,964 A | 9/1997 | Dent | |
| 5,945,948 A * | 8/1999 | Buford et al. | 342/457 |
| 5,960,355 A * | 9/1999 | Ekman et al. | 455/456.1 |
| 6,061,337 A | 5/2000 | Light et al. | |
| 6,148,198 A | 11/2000 | Anderson et al. | |
| 6,195,046 B1 | 2/2001 | Gilhousen | |
| 6,236,365 B1 | 5/2001 | LeBlanc et al. | |
| 6,246,861 B1 * | 6/2001 | Messier et al. | 455/12.1 |
| 6,321,083 B1 * | 11/2001 | Vaara et al. | 455/446 |
| 6,639,554 B1 * | 10/2003 | Kim et al. | 342/457 |
| 6,701,132 B1 * | 3/2004 | Fukuzawa et al. | 455/67.16 |
| 2002/0002066 A1 * | 1/2002 | Pallonen | 455/562 |
| 2002/0052208 A1 * | 5/2002 | Porcino | 455/456 |
| 2002/0149518 A1 * | 10/2002 | Haataja et al. | 342/458 |
| 2002/0175854 A1 * | 11/2002 | Shioda et al. | 342/357.1 |

FOREIGN PATENT DOCUMENTS

| | | | |
|---|---|---|---|
| JP | 11298945 | | 10/1999 |
| JP | 411298945 | | 10/1999 |
| JP | 411298945 A | * | 10/1999 |
| WO | 96/01531 | | 1/1996 |
| WO | WO 96/01531 | * | 1/1996 |
| WO | 96/42179 | | 12/1996 |
| WO | 02/47421 | | 6/2002 |

* cited by examiner

*Primary Examiner*—William Trost
*Assistant Examiner*—Meless Zewdu
(74) *Attorney, Agent, or Firm*—Volpe and Koenig, P.C.

(57) ABSTRACT

Apparatus and methods are disclosed for estimating the position and velocity of mobile wireless transmit/receive units (WTRUs) in a wireless communication system. Network stations use directional communication beams to divide service areas into sectors to provide communication services to the WTRUs. A WTRU saves pertinent information such as sector ID, received power and time of reception of the several received signals. The collected information is sent to the network, where it is used to estimate the WTRU's position, speed and direction of travel, which information can then be used to improve radio resource management.

11 Claims, 2 Drawing Sheets

METHOD AND SYSTEM FOR DETERMINING THE SPEED AND POSITION OF A MOBILE UNIT

CROSS REFERENCE TO RELATED APPLICATION

This application claims priority from U.S. Provisional Patent Application No. 60/392,413 filed on Jun. 28, 2002, which is incorporated by reference as if fully set forth.

BACKGROUND OF THE INVENTION

The present invention is directed to wireless communication systems. More particularly, the invention is related to a cellular system using a plurality of smart antennas for determining the speed and distance of a wireless transmit receive unit (WTRU).

In current wireless system deployments, the speed and position of WTRUs are determined using many different methods. For example, global positioning system (GPS) may be used for those WTRUs with GPS capability. Alternatively, the network may determine the speed and position using triangulation techniques. Each of these techniques generally have undesirable drawbacks. For example, the GPS affixes significant expense and complexity to a WTRU. A WTRU that is equipped with a GPS is basically a device with two receivers, one for interfacing with the cellular system and the second for the reception of the positioning satellites. The additional receiver increases the battery consumption and uses up valuable WTRU resources.

Another method for WTRU position determination employs triangulation techniques that require the use of additional primary stations and/or extra hardware in each primary station to support the triangulation.

It would desirable to provide an improved WTRU tracking mechanism which is able to effectively locate a WTRU when it is in communication with a primary station.

SUMMARY

The present invention comprises a method and system where a common channel (such as a beacon channel) is swept over a specified coverage area of a sectorized cell. An idle WTRU saves pertinent information such as received power and time of reception of the last several readings of the common channel. On the WTRU's next access, the information is sent to the network to determine the WTRU's location, its direction of travel and a speed estimate which is valuable for radio resource management.

DETAILED DESCRIPTION OF THE PREFERRED EMBODIMENT

Figure 1A:
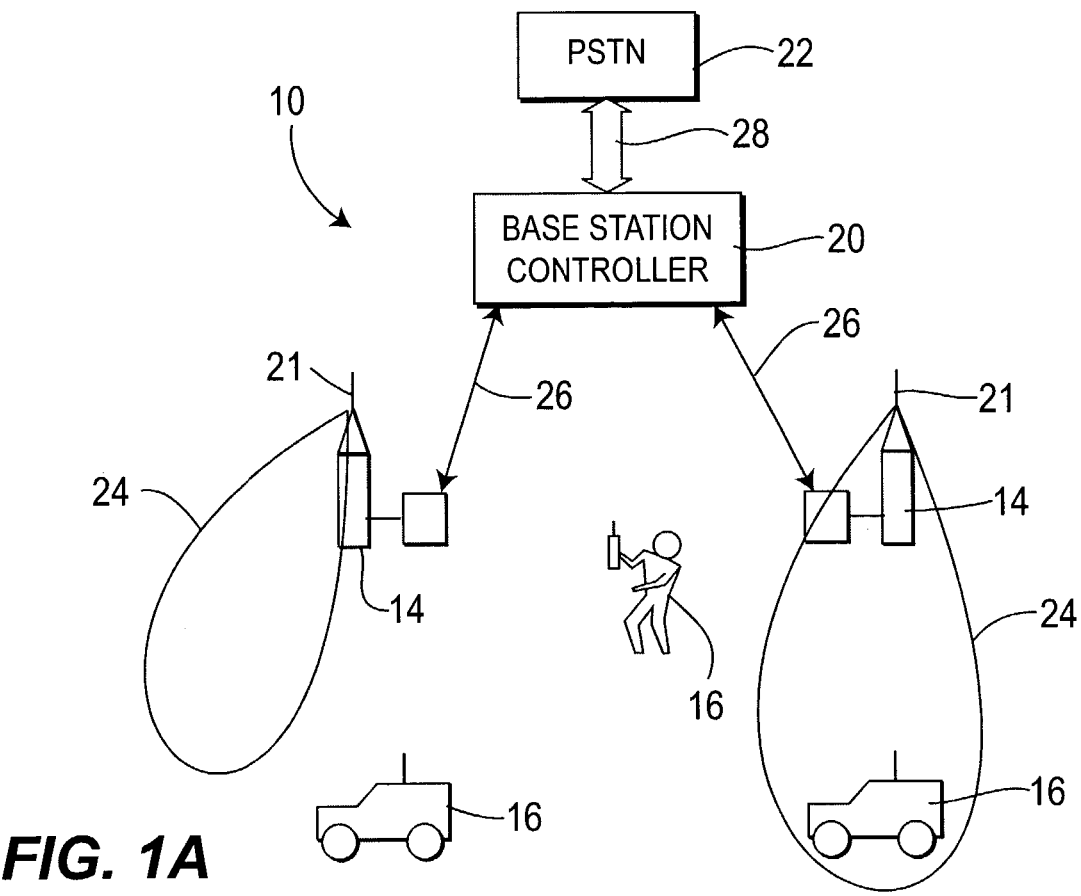
FIG. 1A is a diagram of a communication system in accordance with the teachings of which incorporates the present invention.

The present invention will be described with reference to the drawing figures wherein like numerals represent like elements throughout. Referring to FIG. 1A, a communication network 10 generally comprises one or more primary stations 14, each of which is capable of wireless communication with a plurality of WTRUs 16. Each WTRU 16 communicates with either the closest primary station 14 or the primary station 14 which provides the strongest communication signal. WTRUs in general are well known in the art and are used as vehicle telephones or hand held cell phones. Generally such WTRUs are also known as mobile units. Primary stations are also known as base stations.

Figure 1B:
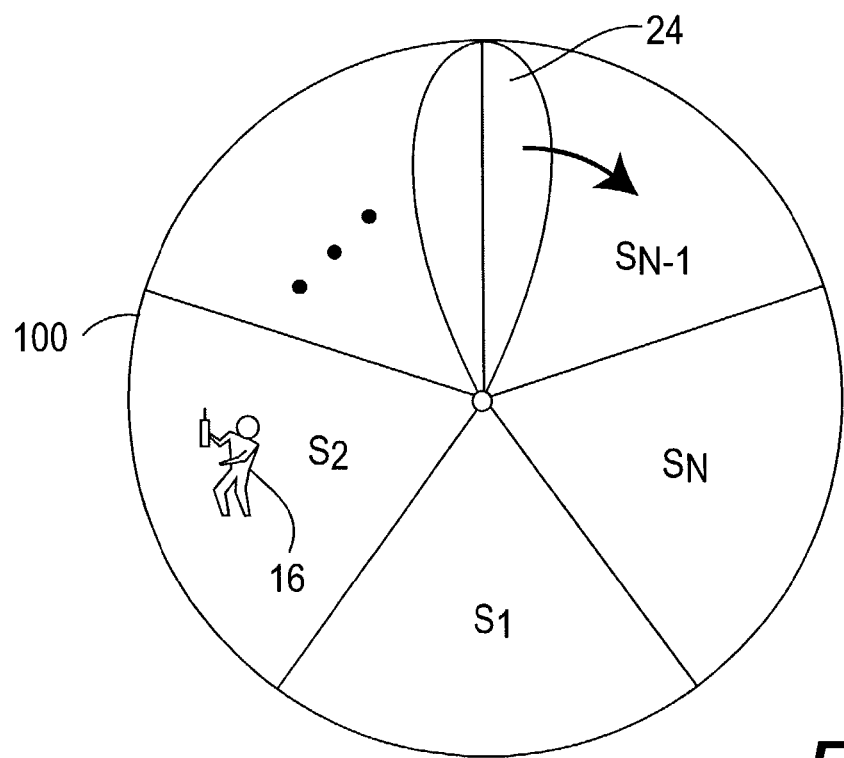
FIG. 1B is a diagram of a convergence area of a primary station of the system illustrated in FIG. 1A.

Each primary station 14 broadcast and receives signals through the coverage area 10 via the primary stations' antenna 21. The antenna 21, through its antenna array, shapes the antenna's radiation pattern into the form of a beam 24. The beam 24 is swept throughout a coverage area 100 as shown in FIG. 1B. The coverage area 100 comprises a plurality of sectors $S_1 \ldots S_N$. The base station controller 20 coordinates communications among multiple primary stations 14 by means of a network path 26 which may be a land line or wireless link. The communication network 10 may optionally be connected to a public switched telephone network (PSTN) 22 via a PSTN network path 28. Although the wireless communication system 10 is shown employing separate units for the network 26 and the primary stations 14, these functions may be physically combined with a base station 14 to form a "master primary station."

Figure 2:
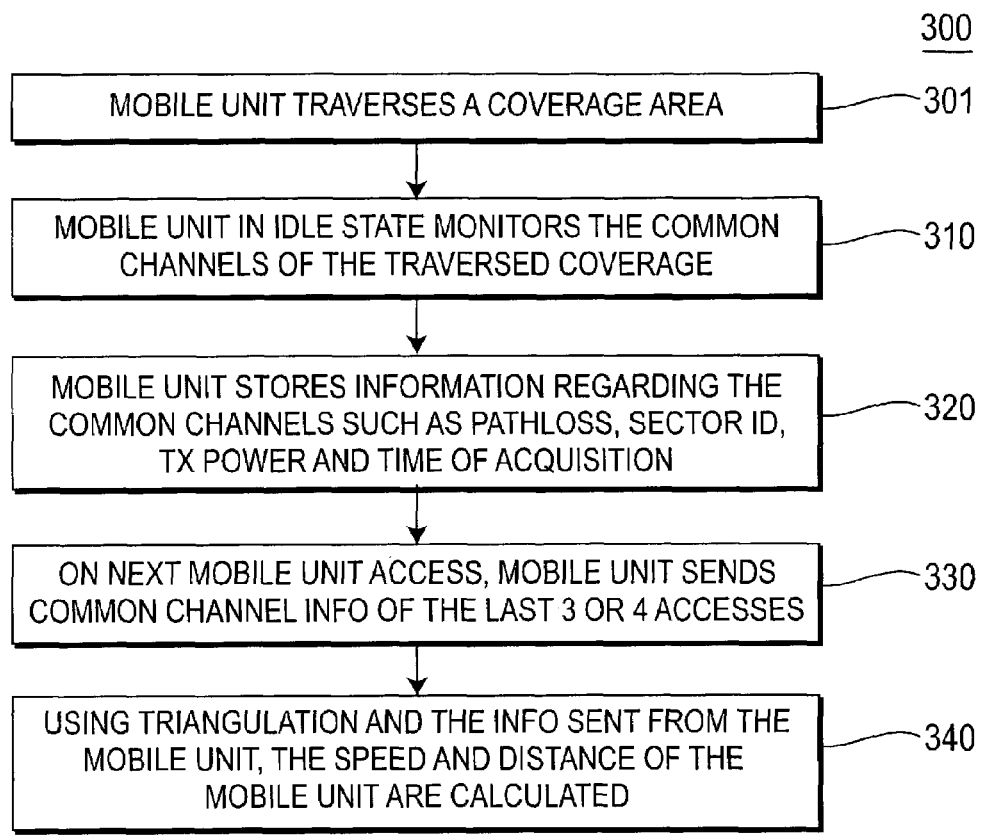
FIG. 2 is a flow diagram of a method for determining speed and distance of a WTRU in accordance with the teachings of the present invention.

With reference to FIG. 1A. and FIG. 2, a WTRU 16 traverses (step 301) through one or more sectors of the coverage area 100 of a primary stations 14, which is swept by a beam 24. The WTRUs 16 are configured to monitor one or more common channels when in an idle state (step 310), for example, the beacon channel which is broadcast by a primary station 14 throughout of the coverage area 100. Common channels by design are meant to be received by all WTRUs within the coverage area. As the idle (turned-on, but not active in user information exchange) WTRU 16 stays stationary or moves about the coverage area, it will store information about and from the beacon channel (step 320). This information may include the time, signal path loss, sector ID, beacon transmit power, received power and received interference level. The WTRU 16 later uplinks the information it has collected from the common channel to the primary stations 14 (step 330). The information will then be used by the network to determine the speed, distance and direction of the mobile (step 340).

When the WTRU 16 acquires a common channel, the common channel may also contain information from the primary station 14 that will assist the network 20 determine the WTRU's location. For example, the network 20 will instruct the primary stations 14 to systematically sweep the beam 24 in a deterministic fashion throughout the coverage area to carve out sectors (see FIG. 1B). The network 20 can append the common channels with a sector ID or beam number which indicates the sector the beam is transmitting in. The WTRU 16 later uplinks the time stamped information to the network 20. The network 20 can then use the sector id or beam number received by the WTRU 16 along with the calculated path loss to calculate the location of the WTRU 16 relative to the primary station 14. The pathloss is based upon the transmission power of the primary station 14 and the received power at the WTRU 16. An appropriate environmental model is then applied to compensate for the effects of the terrain. For example, if the environment were rural, then the network would use a rural environment model in its calculations.

Figure 3:
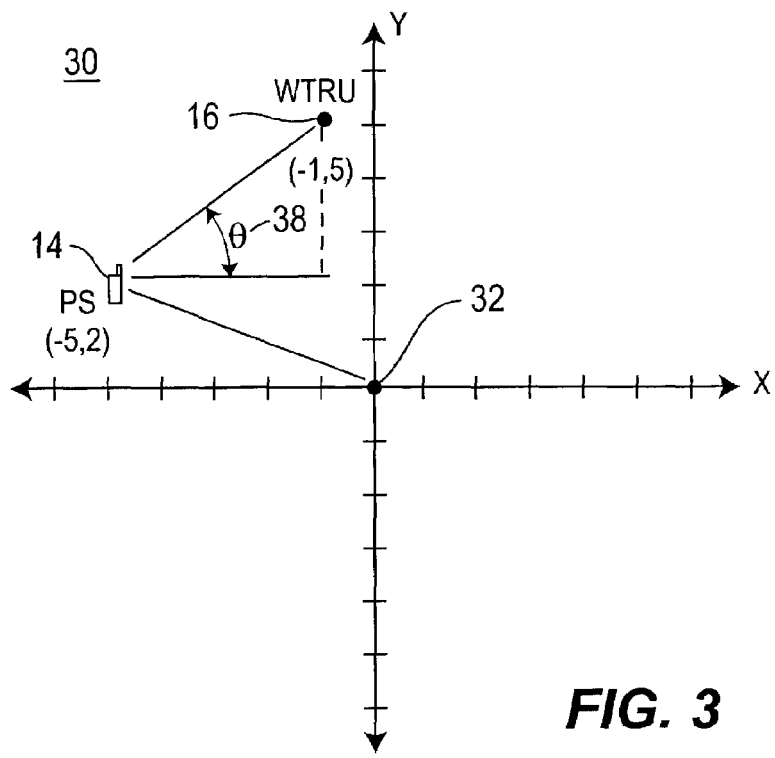
FIG. 3 is an example of the WTRU Cartesian coordinate representation of the coverage area as illustrated in FIG. 1B.

The position of the primary station is known and the network can translate the relative position into an absolute position. It should be noted that the position of the primary station is not an absolute position, it is a relative value to a known reference point using an X,Y grid or Cartesian coordinate system. The X axis represents the east and west direction and the Y axis represent the north and south direction. The grid values are usually in meters or kilometers. An example of the WTRU Cartesian coordinate representation for a coverage area is illustrated in FIG. 3.

To locate the position of a WTRU (WTRU_X, WTRU_Y), the $\Delta X$ and $\Delta Y$ distances are first determined as the X and Y distance from the primary station and the WTRU. The WTRU_X of the WTRU's position can be found in Equation 1:

$$WTRU\_X = \Delta X + PS\_position\_X;\qquad \text{Equation 1}$$

where $\Delta X$ is the X distance from WTRU to the PS and PS_position_X is the X coordinate of the PS. The WTRU_Y of the WTRU position can be found by Equation 2:

$$WTRU\_Y = \Delta Y + PS\_position\_Y;\qquad \text{Equation 2}$$

where $\Delta Y$ is the Y distance form WTRU to the PS and PS_position_Y is the Y coordinate of the PS.

The distance from the Primary Station to the WTRU can be found from Equation 3:

$$Distance\_TO\_WTRU = \sqrt{(\Delta X^2) + (\Delta Y^2)};\qquad \text{Equation 3}$$

where $\Delta X$ and $\Delta Y$ are the values from above equations. The azimuth angle from the PS to the WTRU can be found from Equation 4:

$$Azimuth(WTRU) = \tan^{-1}(\Delta Y/\Delta X)\qquad \text{Equation 4}$$

where Azimuth is the azimuth angle in degrees.

Referring to FIG. 3, a exemplary coverage area 30, is referenced by a Cartesian coordinate system with the reference point (RP) 32 located at the origin (0,0). A PS 14 is located at coordinates (−5,2) and a WTRU 16 is located at (−1,5). The azimuth angle Φ 38 is the angle from the PS 14 to the WTRU 16. To calculate the distance from the PS 14 to the WTRU 16, the $\Delta X$ and $\Delta Y$ values must be obtained. The $\Delta X$ and $\Delta Y$ values are the X and Y distances from the PS 14 to the WTRU 16, respectively, which were obtained from calculations using pathloss and known PS transmit power and received power at the WTRU 16. The $\Delta X$ is equal to 4 and the $\Delta Y$ is equal to 3. Equation 3 is the used to determine that the distance from PS to WTRU 16, which is 5 meters. The azimuth angle Φ 38 is determined from Equation 4 which is approximately 39 degrees.

The distance calculation is dependent upon the pathloss calculation and environmental variables, such atmospheric conditions. A typical propagation in free space model for determining the distance based on the pathloss and environment is shown in Equation 5:

$$Distance = 10^{(Pathloss-32.4-20log(f))/20};\qquad \text{Equation 5}$$

where f is the center carrier frequency in MHz; distance is in Km and the pathloss is in dB. Another method to calculate distance is the plane earth propagation model, which is illustrated by Equation 6:

$$Distance = 10^{(pathloss+20log(HbHm))/40};\qquad \text{Equation 6}$$

where Hb is the height of the base station antenna (meters); Hm is height of mobile station antenna (meters) and the distance is in meters. In yet another method to calculate distance is the cost-231 Hata model for pathloss calculation is illustrated by Equations 7:

$$Pathloss = 46.3 + 33.9log(f) - 13.82log(Hb) - a(Hm) + (44.9 - (6.55log(Hb)))*log(distance) + Cm;\qquad \text{Equation 7}$$

and for distance, Equation 8:

$$Distance = 10^{(Pathloss-46.3-33.9log(f)+13.82log(Hb)-a(Hm)-Cm)/(44.9-6.55log(Hb))};\qquad \text{Equation 8}$$

where Hb and Hm are the base station's and the WTRU's antenna heights in meters; f is the center frequency in MHz; the distance is in Km; a is a correction factor in dB for the antenna height of the mobile for a medium small urban city and is illustrated in Equation 9:

$$(Hm) = (1.1log f - 0.7)Hm - 1.56log f + 0.8;\qquad \text{Equation 9}$$

where the value of Cm changes depending on suburban or rural environments. For the suburban environmental model the Cm value is 0 dB and for the metropolitan environmental model, a 3 dB value is used.

As the WTRU moves about the coverage area, the network 20 can then calculate the speed and direction of the WTRU 16 by comparing WTRU's 16 beam 24 acquisition measurements. For example, to obtain an approximate speed determination, a simple equation such as the change in position divided by the change in time is shown in Equation 10:

$$speed = \Delta\ position/\Delta time;\qquad \text{Equation 10}$$

where $\Delta$ position is change in position and $\Delta$time is the change in time.

A further breakdown of Equation 1 is illustrated by Equation 11:

$$speed = (P_n - P_{n-1})/(T_n - T_{n-1});\qquad \text{Equation 11}$$

where $P_n$ and $T_n$ represent the current position and the current time of the WTRU 16 and $P_{n-1}$ and $T_{n-1}$ represent a previous position and its associated time.

It should be noted that the estimate of speed depends on the accuracy of the position estimates. The position estimates may become inaccurate if the coverage area 100 is large or if the WTRU 16 is near the furthermost perimeter of the cell. However, if the coverage area 100 is relatively small and the WTRU 16 is close to the center of the cell, the estimate will be highly accurate. The size of the sector will also impact the position estimate; more sectors will slice the coverage area into more positional determinable locations.

To obtain the direction of the WTRU, the system may simply use the current and previous locations of the WTRU. First the distance is calculated using the equations above and in FIG. 3.

In order to achieve the most efficient assignment of resources, it is highly desirable to produce an estimate of the position and speed of the WTRU 16 when it first comes into the coverage area 100. This allows the communication network 10 to employ admission algorithms and efficiently assign communication resources.

In another embodiment, the communications system may utilize neighboring primary stations or neighboring cells to more accurately estimate the position of a WTRU 16. When the WTRU 16 accesses a primary station 14, the communications may be monitored up by neighboring primary stations which also use adaptive antenna receivers. The linked receiving primary stations are then able to determine the location of the WTRU 16 using simple triangulation techniques to more accurately calculate the WTRU's position.

In an alternative embodiment, three or more WTRU beacon measurements are taken by the WTRU and reported back to the communications system. This allows for better determination of the speed and the direction of the WTRU.

While the present invention has been described in terms of the preferred embodiment, other variations which are within the scope of the invention as outlined in the claims below will be apparent to those skilled in the art.

What is claimed is:

1. A method for determining a position, speed and direction of movement of a wireless transmit/receive unit (WTRU), the method comprising:
   transmitting wireless communication signals from a network station in directional beams from a known location such that beams are from time to time transmitted to each area serviced by the network station, each beam including beam identifying information;
   a WTRU receiving a plurality of the transmitted directional beams, including beam identifying information for each of the received beams;
   for each of the plurality of received beams, the WTRU measuring the respective received signal strength and storing respective beam identifying information data with respective measured received signal strength data;
   the WTRU transmitting to the network station stored beam identifying information data and received signal strength data for the plurality of received beams; and
   the WTRU receiving, measuring, storing and transmitting steps being performed with respect to a selected number of no less than three directional beams successively transmitted from the network station; and
   estimating the position, speed and direction of movement of the WTRU using beam identifying information data and received signal strength data for the plurality of received beams received from the WTRU, the WTRU receiving, measuring, storing and transmitting steps being performed with respect to a selected number of no less than three directional beams successively transmitted from the network station.

2. The method according to claim 1 wherein:
   the storing of beam identifying information data for each beam includes storing a direction of the beam, a time the beam was sent and a transmit power of the beam; and
   the estimating the position, speed and direction of movement of the WTRU includes:
   calculating a signal pathloss from the beam identifying information data and received signal strength data, for each of the plurality of beams;
   estimating, from the calculated pathloss, a distance from the network station known transmission location to the WTRU for each of the plurality of beams;
   estimating, from the network station known transmission location and the respective estimated distances, a position of the WTRU each of the plurality of beams; and
   estimating the WTRU's speed and direction of movement using the plurality of position estimates in combination with the times the respective beams were sent.

3. The method according to claim 2 wherein the distance from the network station to the WTRU is estimated using one of: and environmental factor, a cost-231 Hata model, a plane earth propagation model or a free space model.

4. The method according to claim 1 wherein the transmitting directional beams is performed by a network station of a wireless communication network.

5. A network station for a wireless communication network configured to provide communication services in a geographic area of service to wireless transmit/receive units (WTRUs), the network station comprising:
   a transmitter configured to periodically generate directional beams for providing communication services in sectors of the geographic area of service such that each beam provides service to a predefined sector whereby collectively the directional beams provide service to the entire geographic service area;
   the transmitter configured to generate the directional beams such that each directional beam includes directional beam identifying information data that at least includes transmission sector identification information; and
   a receiver configured to receive from WTRUs receiving transmitted directional beams from the network station collected data sets with respect to a predetermined number, not less than three, of network station transmitted beams including beam identifying information data and WTRU received signal strength data for a plurality of network station transmitted beams from which an estimate of location, speed and direction of movement of the respective WTRU can be derived.

6. The network station according to claim 5 wherein:
   the transmitter is configured to generate the directional beams such the directional beam identifying information data for each beam includes the direction the beam is sent, the time the beam is sent and transmission power used to send the beam;
   the receiver is configured to receive data sets of beam identifying information data and WTRU received signal strength data with respect to a predetermined number, not less than three, of network station transmitted beams.

7. The invention according to claim 5 further comprising a controller operatively associated with the receiver and configured to calculate an estimate of location, speed and direction of movement of WTRUs based on the data sets received from WTRUs receiving transmitted directional beams from the network station.

8. The invention according to claim 7 wherein:
   the transmitter is configured to generate the directional beams such the directional beam identifying information data for each beam includes the direction the beam is sent, the time the beam is sent and transmission power used to send the beam;
   the receiver is configured to receive data sets of beam identifying information data and WTRU received signal strength data with respect to a predetermined number, not less than three, of network station transmitted beams.

9. The invention according to claim 7 wherein
   the receiver is configured to receive data sets of beam identifying information data where the beam identifying information data for each beam includes a direction of the beam, a time the beam was sent and a transmit power of the beam; and
   the controller is configured to calculate an estimate of location, speed and direction of movement of a WTRU based on the data sets received from the WTRU related to a plurality of beams by calculating a signal pathloss from the beam identifying information data and received signal strength data, for each of the plurality of beams, estimating, from the calculated pathloss, a distance from the network station known transmission location to the WTRU for each of the plurality of beams, estimating, from the network station known transmission location and the respective estimated distances, a position of the WTRU each of the plurality of beams, and estimating the WTRU's speed and direction of movement using the plurality of position estimates in combination with the times the respective beams were sent.

10. The invention according to claim 9 wherein:
the transmitter is configured to generate the directional beams such the directional beam identifying information data for each beam includes the direction the beam is sent, the time the beam is sent and transmission power used to send the beam;
the receiver is configured to receive data sets of beam identifying information data and WTRU received signal strength data with respect to a predetermined number, not less than three, of network station transmitted beams.

11. A wireless transmit/receive unit (WTRU) configured for use in a wireless communication network in which network stations transmit wireless communication signals in directional beams such that beams are from time to time transmitted to each area serviced by the respective network station, each beam including beam identifying information, the WTRU comprising:
a receiver configured to receive directional beams including beam identifying information transmitted by a network station and to measure the strength of the received beams;
a memory operatively associated with the receiver for storing the beam identifying information and received signal strength for a plurality of beams; and
a transmitter operatively associated with the memory and configure to transmit to the network sets of collected beam identifying information data and received signal strength data for a plurality of beams; and
the memory configured to store and the transmitter configured to transmit sets of beam identifying information data and received signal strength data for a selected number, no less than three, of successively received beams.

* * * * *

UNITED STATES PATENT AND TRADEMARK OFFICE
CERTIFICATE OF CORRECTION

PATENT NO. : 7,123,924 B2
APPLICATION NO. : 10/330637
DATED : October 17, 2006
INVENTOR(S) : Angelo Cuffaro It is certified that error appears in the above-identified patent and that said Letters Patent is hereby corrected as shown below:

At column 2, line 16, after the words "station 14", delete "broadcast" and insert therefor --broadcasts--.

At column 2, line 38, after the word "throughout", delete "of".

At column 3, delete Equation 3 and insert therefor
--Distance_TO_WTRU= $\sqrt{(\Delta X^2)+(\Delta Y^2)}$ ;--.

At column 3, line 51, before the word "used", delete "the" and insert therefor --then--.

IN THE CLAIMS

At claim 1, column 5, lines 40-44, after the words "from the WTRU", delete ", the WTRU receiving ... network station." and insert therefor --.--.

At claim 5, column 6, line 24-25, after the word "data", delete "for a plurality of network station transmitted beams".

At claim 6, column 6, line 33, after the word "beam", delete ";" and insert therefor --.--.

At claim 6, column 6, delete lines 34 - 38, "the receiver ... transmitted beams".

At claim 8, column 6, line 47, after the word "such", insert --that--.

At claim 8, column 6, line 50, after the word "beam", delete ";" and insert therefor --.--.

At claim 8, column 6, delete lines 51 - 55, "the receiver ... transmitted beams".

At claim 9, column 7, line 2, before the word "known", delete "station" and insert therefor --station's--.

At claim 9, column 7, line 4, before the word "known", delete "station" and insert therefor --station's--.

At claim 9, column 7, line 6, after "WTRU", insert --from--.

At claim 10, column 7, line 16, after the word "beam", delete ";" and insert therefor --.--.

At claim 10, column 7, delete lines 17 - 21, "the receiver ... transmitted beams".

UNITED STATES PATENT AND TRADEMARK OFFICE
CERTIFICATE OF CORRECTION

PATENT NO. : 7,123,924 B2
APPLICATION NO. : 10/330637
DATED : October 17, 2006
INVENTOR(S) : Angelo Cuffaro It is certified that error appears in the above-identified patent and that said Letters Patent is hereby corrected as shown below:

At claim 11, column 8, line 12, after the word "beams;", delete "and".

At claim 11, column 8, line 14, before the words "to transmit", delete "configure" and insert therefor --configured--.

Signed and Sealed this

Seventeenth Day of April, 2007

JON W. DUDAS
*Director of the United States Patent and Trademark Office*